(12) United States Patent
Sugimoto

(10) Patent No.: US 10,155,566 B2
(45) Date of Patent: Dec. 18, 2018

(54) INTERCHANGEABLE BICYCLE SPROCKET

(71) Applicant: Shimano Inc., Sakai-shi, Osaka (JP)

(72) Inventor: Akinobu Sugimoto, Sakai (JP)

(73) Assignee: Shimano Inc., Sakai-shi, Osaka (JP)

( * ) Notice: Subject to any disclaimer, the term of this patent is extended or adjusted under 35 U.S.C. 154(b) by 196 days.

(21) Appl. No.: 14/717,990

(22) Filed: May 20, 2015

(65) Prior Publication Data
US 2016/0339995 A1  Nov. 24, 2016

(51) Int. Cl.
*F16H 55/12* (2006.01)
*F16H 55/30* (2006.01)
*B62M 9/10* (2006.01)

(52) U.S. Cl.
CPC ....... *B62M 9/105* (2013.01); *F16H 2055/306* (2013.01)

(58) Field of Classification Search
CPC .......... B62M 9/10; B62M 9/105; B62M 9/12; F16H 55/30; F16H 55/08
USPC ........................................................ 474/160
See application file for complete search history.

(56) References Cited

U.S. PATENT DOCUMENTS

| | | | | |
|---|---|---|---|---|
| 3,956,943 A | * | 5/1976 | Yamasaki | F16H 55/30 474/148 |
| 4,198,876 A | * | 4/1980 | Nagano | B62M 9/10 192/64 |
| 4,278,265 A | * | 7/1981 | Nagano | B60B 27/023 280/160.1 |
| 5,078,653 A | * | 1/1992 | Nagano | B62M 9/10 474/160 |
| 5,087,226 A | * | 2/1992 | Nagano | B62M 9/10 474/160 |
| 5,192,248 A | * | 3/1993 | Nagano | B62M 9/105 474/140 |
| 5,192,249 A | * | 3/1993 | Nagano | B62M 9/10 474/160 |
| 5,413,534 A | * | 5/1995 | Nagano | B62M 9/105 474/160 |
| 5,458,543 A | * | 10/1995 | Kobayashi | B62M 9/10 474/160 |
| 5,464,373 A | * | 11/1995 | Leng | B62M 9/105 474/140 |
| 5,609,536 A | * | 3/1997 | Hsu | B62M 9/10 474/160 |
| 5,738,603 A | * | 4/1998 | Schmidt | B62M 9/10 474/158 |
| 5,830,096 A | * | 11/1998 | Schmidt | B62M 9/10 474/156 |

(Continued)

FOREIGN PATENT DOCUMENTS

| | | |
|---|---|---|
| CN | 1075288 A | 8/1993 |
| CN | 1337340 A | 2/2002 |

*Primary Examiner* — Henry Y Liu
(74) *Attorney, Agent, or Firm* — Alleman Hall Creasman & Tuttle LLP

(57) ABSTRACT

A bicycle sprocket is provided. The bicycle sprocket has a rotational center axis and includes a first shifting facilitation area configured to facilitate a first shifting operation from a first sprocket toward the bicycle sprocket, and a second shifting facilitation area configured to facilitate a second shifting operation from a second sprocket toward the bicycle sprocket. The first tooth number of the first sprocket is different from the second tooth number of the second sprocket.

27 Claims, 13 Drawing Sheets

(56) References Cited

U.S. PATENT DOCUMENTS

| | | | | |
|---|---|---|---|---|
| 5,876,296 A * | 3/1999 | Hsu | B62M 9/10 | 474/140 |
| 6,007,442 A * | 12/1999 | Schmidt | B62M 9/10 | 474/122 |
| 6,572,500 B2 * | 6/2003 | Tetsuka | B62M 9/10 | 474/160 |
| 6,805,645 B2 * | 10/2004 | Mao | B62M 9/10 | 474/152 |
| 6,860,171 B1 * | 3/2005 | Nanko | B62M 3/003 | 474/160 |
| 7,871,347 B2 * | 1/2011 | Kamada | B62M 9/10 | 474/152 |
| 8,092,329 B2 * | 1/2012 | Wickliffe | B62M 9/105 | 474/160 |
| 8,235,850 B2 * | 8/2012 | Lin | B62M 9/105 | 474/160 |
| 8,506,436 B2 * | 8/2013 | Wickiffe | B62M 9/105 | 474/160 |
| 8,517,874 B2 * | 8/2013 | Reiter | F16H 55/30 | 474/152 |
| 8,550,944 B2 * | 10/2013 | Esquibel | B62M 9/10 | 474/160 |
| 8,617,015 B2 * | 12/2013 | Wickliffe | F16H 55/30 | 474/140 |
| 8,821,329 B2 * | 9/2014 | Wickliffe | B62M 9/105 | 474/140 |
| 2002/0006842 A1 * | 1/2002 | Tetsuka | B62M 9/10 | 474/160 |
| 2005/0119080 A1 * | 6/2005 | Wei | B62M 9/10 | 474/160 |
| 2006/0172840 A1 * | 8/2006 | Kamada | B62M 9/10 | 474/152 |
| 2010/0081531 A1 * | 4/2010 | Esquibel | B62M 9/10 | 474/160 |
| 2010/0317479 A1 * | 12/2010 | Delale | B62M 3/003 | 475/213 |
| 2012/0202633 A1 * | 8/2012 | Wickliffe | B62M 9/105 | 474/160 |
| 2013/0316863 A1 * | 11/2013 | Reiter | F16H 55/30 | 474/160 |
| 2014/0113757 A1 * | 4/2014 | Wickliffe | F16H 55/30 | 474/160 |

* cited by examiner

INTERCHANGEABLE BICYCLE SPROCKET

BACKGROUND

The present invention relates to a bicycle sprocket.

Bicycle sprockets are used in bicycle drive trains to transmit rotational energy from the pedaling action of a rider via a chain to a rear wheel of the bicycle. Many bicycles feature multiple front sprockets provided in a front sprocket assembly and multiple rear sprockets provided in a rear sprocket assembly. Each of the front and rear assemblies has a plurality of sprockets of different diameters and different numbers of teeth. Such bicycles also include shifting mechanisms for shifting the chain among the different sprockets of the front sprocket assembly and rear sprocket assembly, to thereby achieve a desired gear ratio. On the sprockets of these sprocket assemblies, shift aiding structures have been positioned at precise locations to aid in transitioning the chain between sprockets during shifting, to reduce noise, vibration, derailment, skipping, slipping, delayed chain engagement, and chain suck during shifting. The precise location for these shift aiding structures depends on the geometry of each sprocket.

Depending on circumstances such as terrain, style of riding, fitness level, etc. a rider may desire to change a front or rear sprocket on a bicycle, to achieve a different gear ratio. Heretofore, since the front and rear sprocket assemblies have been designed so that the positions of the shift aiding structures among the sprockets are optimized, a rider could not exchange sprockets as desired without adversely affecting a shifting operation. In other words, if a rider exchanges a sprocket to achieve a different gear ratio, there is then a challenge in providing effective shift aiding structures. Since prior shift aiding structures have been positioned on the sprockets based on the particular geometrical relationship between each adjacent pair of sprockets of different sizes in the sprocket assembly, it is an as-yet-unanswered challenge to provide such shift aiding structures on a sprocket that will be interchangeably paired with other sprockets of different sizes.

SUMMARY

To address the above issues, a bicycle sprocket is provided. According to a first aspect of the invention, a bicycle sprocket is provided that has a rotational center axis and includes a first shifting facilitation area configured to facilitate a first shifting operation from a first sprocket having a first tooth number toward the bicycle sprocket, and a second shifting facilitation area configured to facilitate a second shifting operation from a second sprocket having a second tooth number toward the bicycle sprocket. The first tooth number is different from the second tooth number. One potential advantage of this configuration is that it is possible to exchange the combination of the bicycle sprocket and the first sprocket for the combination of the bicycle sprocket and the second sprocket.

In this aspect, the first sprocket is a smaller sprocket than the bicycle sprocket, and the second sprocket is a smaller sprocket than the bicycle sprocket. One potential advantage of this configuration is that it is possible to exchange a smaller sprocket from the first sprocket to the second sprocket.

In this aspect, the first shifting facilitation area may include a first spike pin provided on the bicycle sprocket, and the second shifting facilitation area includes a second spike pin provided on the bicycle sprocket. One potential advantage of this configuration is that shifting between more than two different gears with different tooth numbers is facilitated.

In this aspect, the first shifting facilitation area may include a first projection provided on the bicycle sprocket, and the second shifting facilitation area includes a second projection provided on the bicycle sprocket. One potential advantage of this configuration is that shifting between more than two different gears with different tooth numbers is facilitated.

In this aspect, the first projection may be positioned so as to avoid contact of the first projection with the chain in a first chain phase of the chain on the first sprocket during the first shifting operation. One potential advantage of this configuration is that a smooth shifting operation can be achieved in the first chain phase during the first shifting operation.

In this aspect, the first projection may be positioned so as to contact a chain and urge the chain in an axial direction parallel to the rotational center axis to move the chain away from the bicycle sprocket in a second chain phase of the chain on the first sprocket during the first shifting operation, and the second chain phase may be different from the first chain phase. One potential advantage of this configuration is that the projection prevents the bicycle chain from undesirably hitting against the bicycle sprocket, thereby minimizing excess noise and vibration that could result in skipping, slipping, delayed chain engagement, chain suck, and other problems.

In this aspect, the urging of the chain by the first projection may prevent the chain from contacting the first spike pin. One potential advantage of this configuration is that the projection prevents the bicycle chain from undesirably hitting against the spike pin of the bicycle sprocket, thereby minimizing excess noise and vibration that could result in skipping, slipping, delayed chain engagement, chain suck, and other problems.

In this aspect, the second projection may be positioned so as to avoid contact of the second projection with the chain in a first chain phase of the chain on the second sprocket during the second shifting operation, and the second chain phase may be different from the first chain phase. One potential advantage of this configuration is that a smooth shifting operation can be achieved in the first chain phase during the second shifting operation.

In this aspect, the second projection may be positioned so as to contact the chain and urge the chain in an axial direction parallel to the rotational center axis to move the chain away from the bicycle sprocket in a second chain phase of the chain on the second sprocket during the second shifting operation. One potential advantage of this configuration is that the projection prevents the bicycle chain from undesirably hitting against the bicycle sprocket, thereby minimizing excess noise and vibration that could result in skipping, slipping, delayed chain engagement, chain suck, and other problems.

In this aspect, the urging of the chain by the second projection may prevent the chain from contacting the second spike pin. One potential advantage of this configuration is that the projection prevents the bicycle chain from undesirably hitting against the spike pin of the bicycle sprocket, thereby minimizing excess noise and vibration that could result in skipping, slipping, delayed chain engagement, chain suck, and other problems.

In this aspect, the bicycle sprocket may have a third tooth number that is larger than both the first tooth number and the second tooth number, and the first sprocket and the second sprocket may be interchangeably mountable to co-rotate with the bicycle sprocket. One potential advantage of this configuration is that it is possible to switch between more than two different gears with different gears with different tooth numbers.

In this aspect, the first shifting operation may include shifting a chain from the first sprocket to the bicycle sprocket, and the second shifting operation may include shifting the chain from the second sprocket to the bicycle sprocket. One potential advantage of this configuration is that it is possible to switch between more than two different gears with different gears with different tooth numbers.

In this aspect, the first shifting facilitation area and the second shifting facilitation area may be provided at the same location on the bicycle sprocket. One potential advantage of this configuration is that the switching between more than two different gears with different tooth numbers is facilitated by forming a minimum shifting facilitation area.

In this aspect, the first shifting facilitation area and the second shifting facilitation area may be provided so as to be circumferentially spaced apart from each other on the bicycle sprocket with respect to the rotational center axis. One potential advantage of this configuration is that the switching between more than two different gears with different tooth numbers is facilitated.

In this aspect, the first shifting facilitation area may be one of a plurality of first shifting facilitation areas provided on the bicycle sprocket, and the plurality of the first shifting facilitation areas may be disposed so as to be circumferentially spaced apart from each other with respect to the rotational center axis. One potential advantage of this configuration is that the switching between more than two different gears with different tooth numbers is facilitated.

In this aspect, the second shifting facilitation area may be one of a plurality of second shifting facilitation areas provided on the bicycle sprocket, and the plurality of second shifting facilitation areas may be disposed so as to be circumferentially spaced apart from each other with respect to the rotational center axis. One potential advantage of this configuration is that the switching between more than two different gears with different tooth numbers is facilitated.

In this aspect, at least one of the first shifting facilitation areas and at least one of the second shifting facilitation areas may be provided at the same location on the bicycle sprocket. One potential advantage of this configuration is that the switching between more than two different gears with different tooth numbers is facilitated by forming a minimum shifting facilitation area.

In this aspect, the first shifting facilitation area may include a first recess provided on the bicycle sprocket, and the second shifting facilitation area may include a second recess provided on the bicycle sprocket. One potential advantage of this configuration is that the recesses allow the bicycle chain to tilt toward the teeth of the bicycle sprocket, facilitating the switching between different gears.

In this aspect, the first recess provided may be positioned downstream from the first spike pin with respect to a rotational driving direction of the sprocket, and the second recess provided may be positioned downstream from the second spike pin with respect to the rotational driving direction. One potential advantage of this configuration is that the recesses allow the bicycle chain to tilt toward the teeth of the bicycle sprocket, facilitating the switching between different gears.

In this aspect, the first recess may be positioned radially inwardly from the first spike pin with respect to the rotational center axis, and the second recess may be positioned radially inwardly from the second spike pin with respect to the rotational center axis. One potential advantage of this configuration is that the recesses allow the bicycle chain to tilt toward the teeth of the bicycle sprocket, facilitating the switching between different gears.

In this aspect, the bicycle sprocket further may include a body including an annular portion having teeth formed around an outer perimeter thereof, the annular portion including a smaller sprocket facing side on which the first shifting facilitation area and the second shifting facilitation area are provided. One potential advantage of this configuration is that the bicycle sprocket is configured to accommodate two smaller sprockets.

In this aspect, the first projection may be positioned downstream from the first spike pin with respect to a rotational driving direction of the sprocket, and the second projection may be positioned downstream from the second spike pin with respect to the rotational driving direction. One potential advantage of this configuration is that the projection prevents the bicycle chain from undesirably hitting against the bicycle sprocket, thereby minimizing excess noise and vibration that could result in skipping, slipping, delayed chain engagement, chain suck, and other problems.

In this aspect, the first projection may be positioned radially inwardly from the first spike pin with respect to the rotational center axis, and the second projection is positioned radially inwardly from the second spike pin with respect to the rotational center axis. One potential advantage of this configuration is that the projection prevents the bicycle chain from undesirably hitting against the bicycle sprocket, thereby minimizing excess noise and vibration that could result in skipping, slipping, delayed chain engagement, chain suck, and other problems.

In this aspect, the first shifting facilitation area may include a first recess provided on the bicycle sprocket, the second shifting facilitation area may include a second recess provided on the bicycle sprocket, the first projection may be positioned between the first spike pin and the first recess in a radial direction with respect to the rotational center axis, and the second projection may be positioned between the second spike pin and the second recess in a radial direction with respect to the rotational center axis. One potential advantage of this configuration is that the projection prevents the bicycle chain from undesirably hitting against the bicycle sprocket, thereby minimizing excess noise and vibration that could result in skipping, slipping, delayed chain engagement, chain suck, and other problems.

In this aspect, the first projection may be positioned between the first spike pin and the first recess in a circumferential direction with respect to the rotational center axis, and the second projection may be positioned between the second spike pin and the second recess in a circumferential direction with respect to the rotational center axis. One potential advantage of this configuration is that the projection prevents the bicycle chain from undesirably hitting against the bicycle sprocket, thereby minimizing excess noise and vibration that could result in skipping, slipping, delayed chain engagement, chain suck, and other problems.

In this aspect, the first projection may be configured to prevent a chain from engaging the first spike pin during the second shifting operation while the second sprocket is mounted to the bicycle sprocket. One potential advantage of this configuration is that the projection prevents the bicycle chain from undesirably hitting against the bicycle sprocket, thereby minimizing excess noise and vibration that could result in skipping, slipping, delayed chain engagement, chain suck, and other problems.

In this aspect, the second projection may be configured to prevent a chain from engaging the second spike pin during the first shifting operation while the first sprocket is mounted to the bicycle sprocket. One potential advantage of this configuration is that the projection prevents the bicycle chain from undesirably hitting against the bicycle sprocket, thereby minimizing excess noise and vibration that could result in skipping, slipping, delayed chain engagement, chain suck, and other problems.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and not by way of limitation in the figures of the accompanying drawings, in which the like reference numerals indicate like elements and in which:

FIGS. 2-13C are drawn approximately to scale unless otherwise indicated; however, other relative dimensions may be used, if desired.

DETAILED DESCRIPTION

A selected embodiment of the present invention will now be described with reference to the accompanying drawings. It will be apparent to those skilled in the art from this disclosure that the following description of an embodiment of the invention is provided for illustration only and not for the purpose of limiting the invention as defined by the appended claims and their equivalents.

Figure 1:
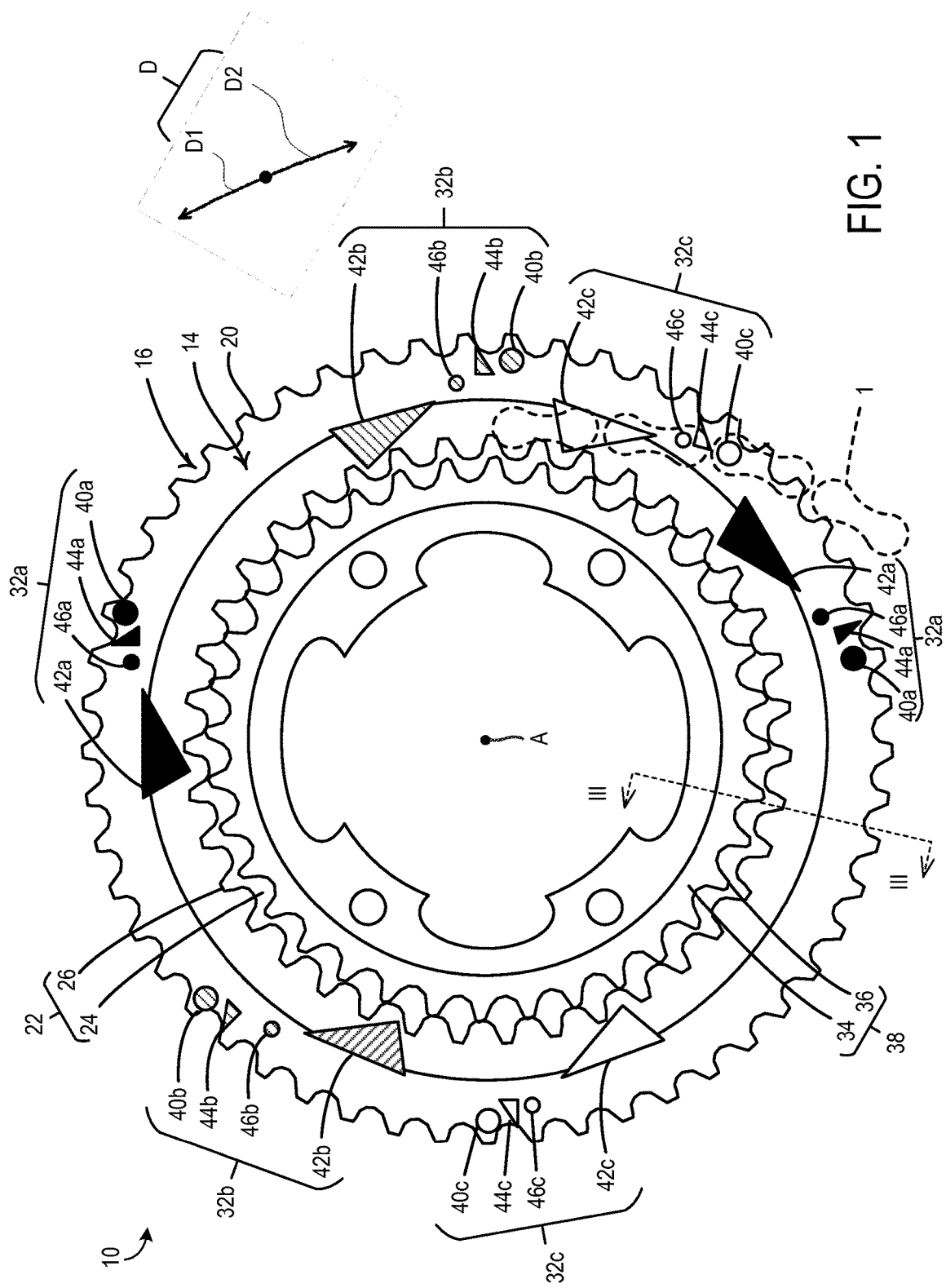
FIG. 1 is an inside elevational view of a bicycle sprocket, a first sprocket, and a second sprocket in accordance with a first embodiment.

Referring to FIG. 1, a schematic depiction of a bicycle sprocket 10, a first sprocket 22 smaller than the bicycle sprocket 10, and a second sprocket 38 smaller than the bicycle sprocket 10 in accordance with a first embodiment is illustrated. It will be appreciated that this illustration is a schematic depiction, aspects of which are not drawn to scale. The bicycle sprocket 10 may be a bicycle front sprocket or bicycle rear sprocket configured to be provided on a gear crank of a bicycle or a rear hub assembly of a bicycle. A first sprocket 22 having a first tooth number and a second sprocket 38 having a second tooth number are interchangeably mountable to co-rotate with the bicycle sprocket 10. Thus, the first sprocket 22 and the second sprocket 38 are not mounted to the bicycle sprocket 10 at the same time in the illustrated embodiment. The bicycle sprocket 10 has a third tooth number that is larger than both the first tooth number and the second tooth number. The first sprocket 22 includes a first sprocket main body 24 and first sprocket teeth 26. The second sprocket 38 includes a second sprocket main body 34 and second sprocket teeth 36. The bicycle sprocket 10 has a rotational center axis A and is configured to engage with a bicycle chain 1. The bicycle sprocket 10 includes a sprocket body 16 including an annular portion, having bicycle sprocket teeth 20 formed around an outer perimeter thereof. The annular portion includes a smaller sprocket facing side on which a first shifting facilitation area 32a and a second shifting facilitation area 32b are provided. The first shifting facilitation area 32a preferably includes a first spike pin 40a, a first projection 46a, a first primary recess 42a and a first secondary recess 44a provided on the bicycle sprocket 10. The first shifting facilitation area 32a is configured to facilitate a first shifting operation, which includes shifting the chain 1 from a first sprocket 22 having a first tooth number toward the bicycle sprocket 10. The first projection 46a may be positioned between the first spike pin 40a and the first primary recess 42a in a radial or circumferential direction with respect to the rotational center axis A. One or more of the first spike pin 40a, the first projection 46a, the first primary recess 42a and the first secondary recess 44a can be omitted according to need. Likewise, the second shifting facilitation area 32b preferably includes a second spike pin 40b, a second projection 46b, a second primary recess 42b and a second secondary recess 44b provided on the bicycle sprocket 10. The second shifting facilitation area 32b is configured to facilitate a second shifting operation, which includes shifting the chain 1 from a second sprocket 38 having a second tooth number, which is different from the first tooth number, toward the bicycle sprocket 10. The second projection 46b may be positioned between the second spike pin 40b and the second primary recess 42b in a radial or circumferential direction with respect to the rotational center axis A. One or more of the second spike pin 40b, the second projection 46b, the second primary recess 42b and the second secondary recess 44b can be omitted according to need. Thus, shifting between more than two different gears with different tooth numbers is facilitated.

The first shifting facilitation area 32a may also be configured to facilitate a shifting operation, which includes shifting the chain 1 from the bicycle sprocket 10 toward the first sprocket 22. Likewise, the second shifting facilitation area 32b may also be configured to facilitate a shifting operation, which includes shifting the chain 1 from the bicycle sprocket 10 toward the second sprocket 38. Accordingly, the first shifting facilitation area 32a can be configured to facilitate a first shifting operation from one of the first sprocket 22 and the bicycle sprocket 10 toward the other of the first sprocket 22 and the bicycle sprocket 10, and the second shifting facilitation area 32b can be configured to facilitate a second shifting operation from one of the second sprocket 38 and the bicycle sprocket 10 toward the other of the second sprocket 38 and bicycle sprocket 10. The bicycle sprocket 10, the first sprocket 22 and the second sprocket 38 may also be bicycle rear sprockets, as described later.

Referring to FIG. 1, the first shifting facilitation area 32a and the second shifting facilitation area 32b are provided so as to be circumferentially spaced apart from each other on the bicycle sprocket 10 with respect to the rotational center axis A. The first shifting facilitation area 32a may be one of a plurality of first shifting areas provided on the bicycle sprocket, disposed so as to be circumferentially spaced apart from each other with respect to the rotational center axis A. Likewise, the second shifting facilitation area 32b may be one of a plurality of second shifting facilitation areas provided on the bicycle sprocket 10, disposed so as to be circumferentially spaced apart from each other with respect to the rotational center axis A. The first and second shifting facilitation areas are not necessarily mutually exclusive, and may overlap in common shifting facilitation areas 32c each of which preferably includes a third spike pin 40c, a third projection 46c, a third primary recess 42c and a third secondary recess 44c. In other words, the common shifting facilitation area 32c is provided if at least one of the first shifting facilitation areas 32a and at least one of the second shifting facilitation areas 32b are provided at the same location on the bicycle sprocket 10. The common shifting facilitation area 32c is configured to facilitate both a first shifting operation from a first sprocket 22 having a first tooth number toward the bicycle sprocket 10 and a second shifting operation from a second sprocket 38 having a second tooth number toward the bicycle sprocket 10. The bicycle sprocket 10 is configured to be rotated about the rotational center axis A in a rotational driving direction D1 during the pedaling. The rotational driving direction D1 is defined along a circumferential direction D of the bicycle sprocket 10. A direction D2 is defined along the circumferential direction D. The direction D2 is opposite to the rotational driving direction D1.

Figure 2:
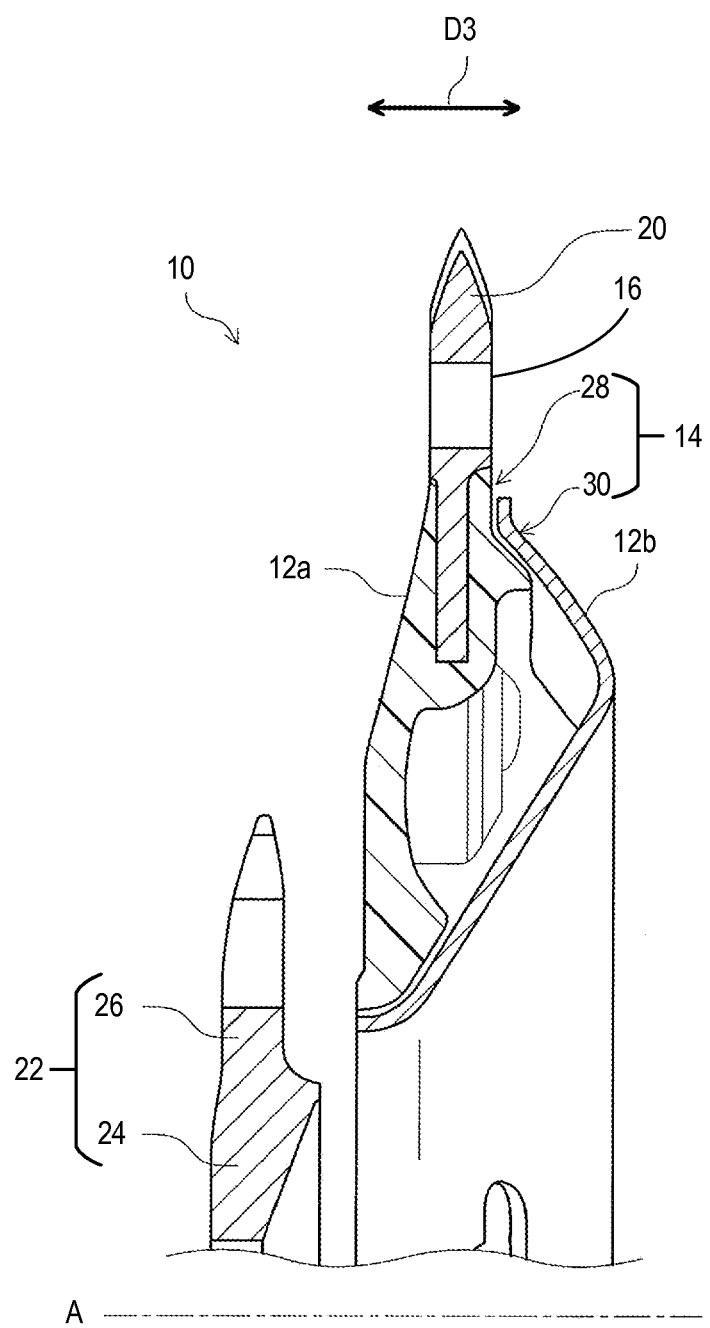
FIG. 2 is a cross-sectional view of the bicycle sprocket taken along line III-III of FIG. 1.

As illustrated in FIG. 2, a magnified cross-sectional view of the bicycle sprocket 10 and the first sprocket 22 are provided, taken along line III-III of FIG. 1. The bicycle sprocket 10 comprises bicycle sprocket teeth 20, a sprocket body 16 and a sprocket main body 14. The sprocket main body 14 includes a base portion 28 to which the sprocket body 16 is attached, and a cover portion 30 attached to the base portion 28 to at least partially cover the base portion 28. The first sprocket 22 comprising a first sprocket main body 24 and first sprocket teeth 26 is provided in proximity to the bicycle sprocket 10 so that a first shifting facilitation area facilitates a first shifting operation of a chain from the first sprocket 22 toward the bicycle sprocket 10. In the illustrated embodiment, the sprocket body 16 may be made of a first material comprising one of iron, aluminum and titanium. The sprocket main body 14 may comprise a non-metallic material. For example, the non-metallic material comprises fiber reinforced plastic. More specifically, the base portion 28 is made of a non-metallic material comprising fiber reinforced plastic while the cover portion 30 is made of a metallic material comprising aluminum, for example. In the illustrated embodiment, the sprocket body 16 and the sprocket main body 14 (i.e., the base portion 28) are attached to each other by an integral molding process. The sprocket body 16 is at least partially embedded in the sprocket main body 14 at the base portion 28. The base portion 28 and the cover portion 30 can be integrally attached together as a single unitary member. In such an embodiment, the sprocket main body 14 is made of a metallic material comprising aluminum, for example.

As seen in FIG. 2, the bicycle sprocket 10 includes an axial surface 12a facing in an axial direction D3 of the bicycle sprocket 10. The axial direction D3 is parallel to the rotational center axis A of the bicycle sprocket 10. The bicycle sprocket 10 further includes an opposite surface 12b, defined on the cover portion 30, opposite to the axial surface 12a in the axial direction D3. The axial surface 12a is disposed closer to the first sprocket 22 than the opposite surface 12b. The axial surface 12a may be inclined with respect to the axial direction D3, and the axial surface 12a may even be substantially perpendicular with respect to the axial direction D3.

Figure 3:
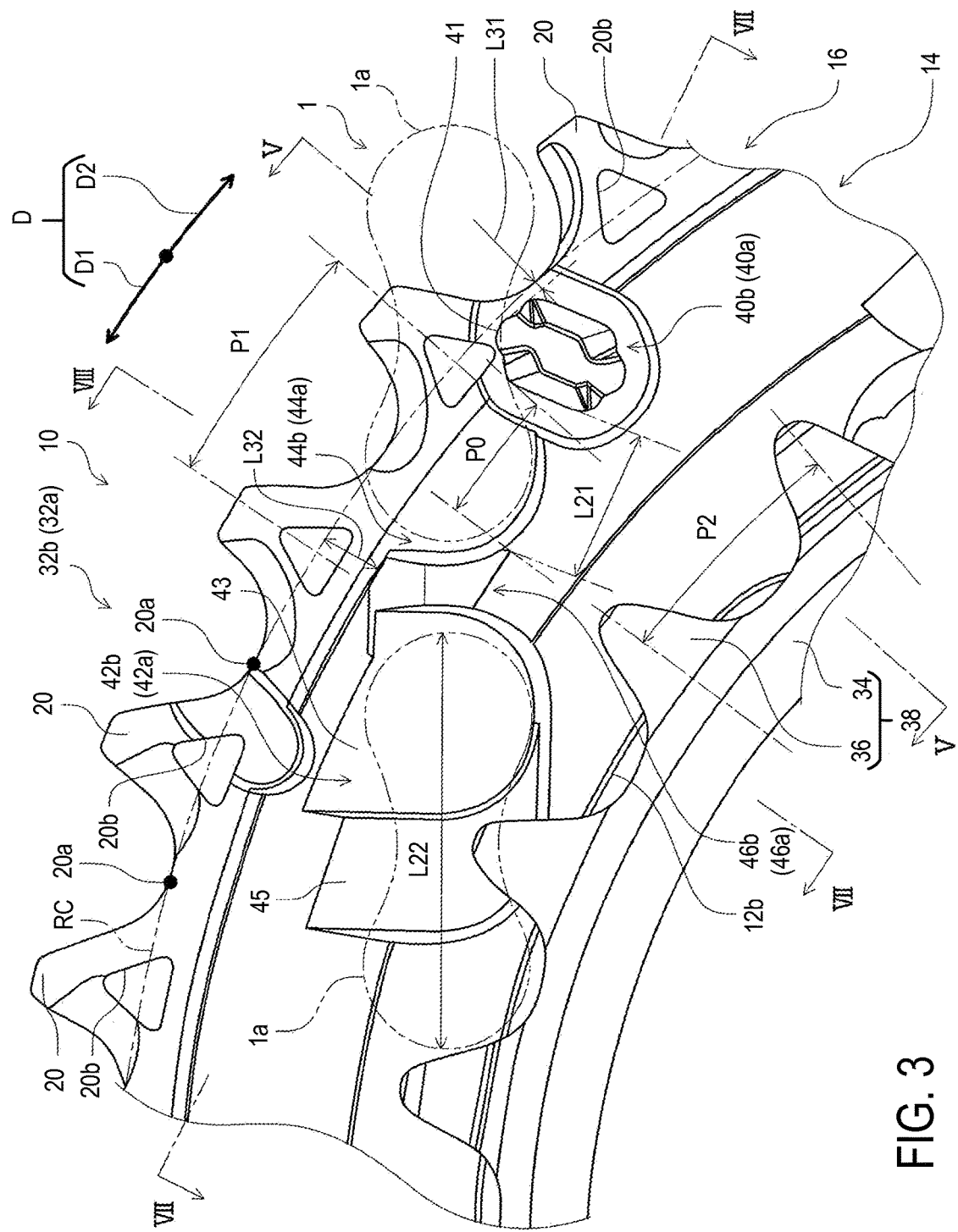
FIG. 3 is an enlarged inside elevational view of a part of the bicycle sprocket illustrated in FIG. 1 (a first chain phase state)

As illustrated in FIG. 3, an inside elevational view of the second shifting facilitation area 32b of the bicycle sprocket 10 in a first chain phase is enlarged in detail, along with an enlarged view of part of the second sprocket 38. The first sprocket 22 has been removed from this view for illustration purposes because the first sprocket 22 and the second sprocket 38 are not mounted to the bicycle sprocket 10 at the same time as mentioned above. Since the first, second, and third shifting facilitation areas all have substantially the same structure, the structure of the second shifting facilitation area 32b will be described here in detail to be representative of the structure of all the shifting facilitation areas.

As shown in FIG. 3, the bicycle sprocket 10 comprises a spike pin 40b provided in the shifting facilitation area 32b. The spike pin 40b made of metallic material is attached to the sprocket body 16 of the bicycle sprocket 10. The spike pin 40b may also be made of a non-metallic material. In the illustrated embodiment, the spike pin 40b is separately provided from the bicycle sprocket 10; however, the spike pin 40b can be integrally provided with the bicycle sprocket 10 as a single unitary member. The spike pin 40b is configured to guide the bicycle chain 1 to engage with the bicycle sprocket 10 in a first chain phase state where the bicycle chain 1 is shifted from the first sprocket 22 or the second sprocket 38 to the bicycle sprocket 10. Accordingly, the term "first chain phase state", as used herein, means a state in which an outer link plate of a bicycle chain is positioned on a spike pin 40b so that the spike pin 40b engages with the outer link plate. When the bicycle chain 1 is axially guided toward the bicycle sprocket 10 using a front derailleur (not shown) during the gear-shifting operation, the bicycle chain 1 is upwardly moved by the spike pin 40b to engage with the bicycle sprocket 10 in the first chain phase state.

Figure 5:
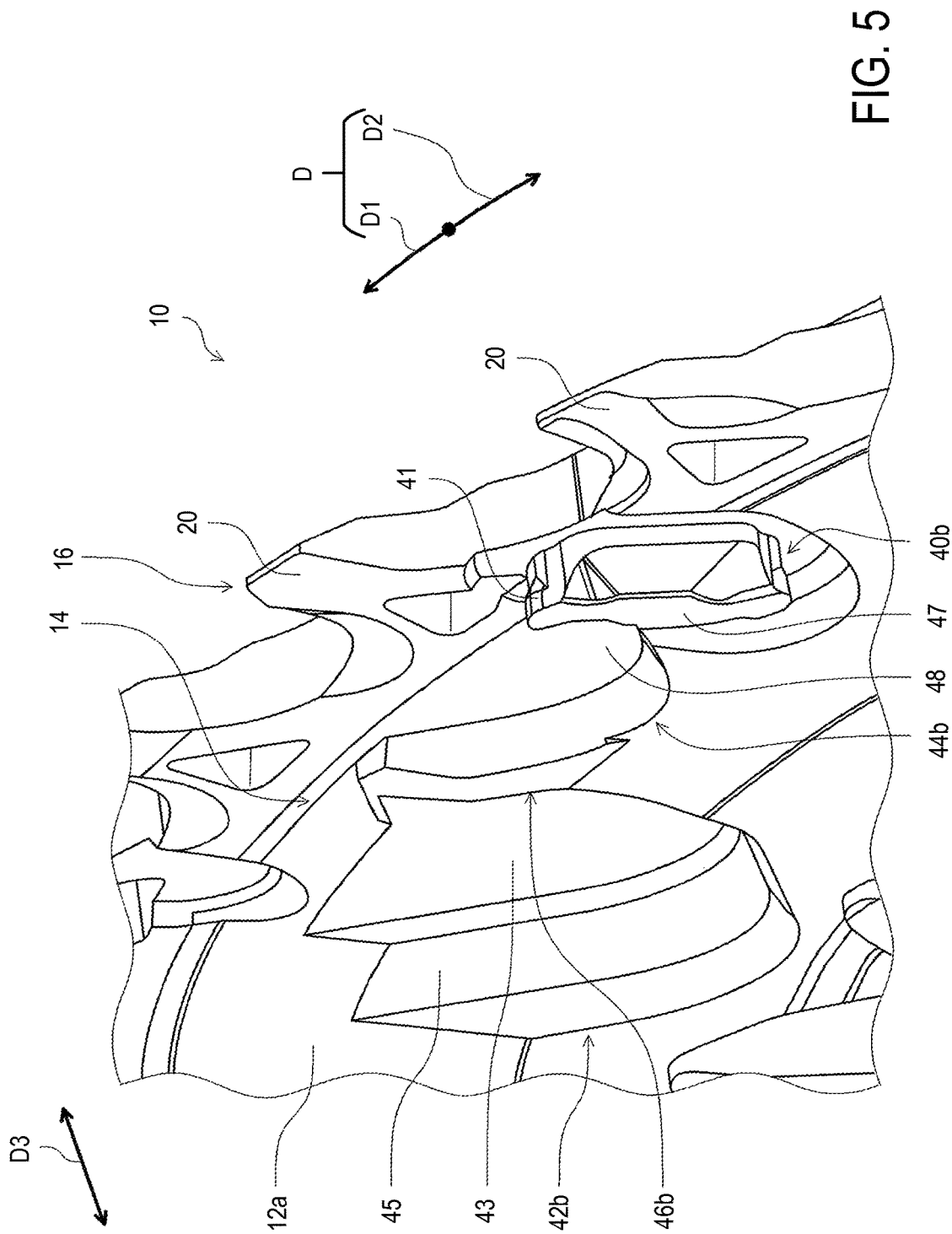
FIG. 5 is a perspective view of a part of the bicycle sprocket illustrated in FIG. 1.

As depicted in FIG. 3, the bicycle sprocket 10 includes a primary recess 42b configured to reduce interference between the bicycle sprocket 10 and the bicycle chain 1 when the spike pin 40b guides the bicycle chain 1 to engage with the bicycle sprocket 10. In this example, the second primary recess 42b of the second shifting facilitation area 32b is illustrated. The second primary recess 42b is positioned downstream and/or radially inwardly from the second spike pin 40b with respect to the rotational center axis A. The second primary recess 42b is provided in the second shifting facilitation area 32b so that the second primary recess 42b is configured to reduce interference between the bicycle sprocket 10 and the bicycle chain 1 in the first chain phase state when an outer link plate 1a of the bicycle chain 1 is partially disposed in the primary recess 42b. Likewise, illustrated in FIG. 1, the first primary recess 42a is positioned downstream and/or radially inwardly from the first spike pin 40a with respect to the rotational center axis A. The first primary recess 42a is provided in the first shifting facilitation area 32a so that the first primary recess 42a is configured to reduce interference between the bicycle sprocket 10 and the bicycle chain 1 in the first chain phase state when an outer link plate 1a of the bicycle chain 1 is partially disposed in the first primary recess 42a. FIG. 5 provides another view of the primary recess 42b from an alternative angle.

As seen in FIG. 3, shifting facilitation area 32b of the bicycle sprocket 10 also includes a secondary recess 44b. The secondary recess 44b is at least partially provided between the spike pin 40b and the primary recess 42b to reduce interference between the bicycle sprocket 10 and the bicycle chain 1 in the first chain phase state when the spike pin 40b guides the bicycle chain 1 to engage with the bicycle sprocket 10. FIG. 5 provides another view of the secondary recess 44b from an alternative angle.

As depicted in FIG. 3, the bicycle sprocket 10 comprises a projection 46b provided in the shifting facilitation area 32b on the bicycle sprocket 10. In this example, the second projection 46b of the second shifting facilitation area 32b is illustrated. The second projection 46b is provided between the second spike pin 40b and the second primary recess 42b, and at least partially provided between the second primary recess 42b and the second secondary recess 44b. The second projection 46b is positioned downstream and/or radially inwardly from the second spike pin 40b with respect to the rotational center axis A (depicted in FIG. 1) in the rotational driving direction D1. The second projection 46b is positioned so as to avoid contact of the second projection 46b with the chain 1 in a first chain phase of the chain 1, illustrated in FIG. 3, on the second sprocket 38 during the second shifting operation. Likewise, in the first shifting facilitation area 32a, illustrated in FIG. 1, the first projection 46a is positioned so as to avoid contact of the first projection 46a with the chain 1 in a first chain phase of the chain 1 on the first sprocket 22 during the first shifting operation. In the illustrated embodiment, the projection 46b is integrally provided with the sprocket main body 14 as a single unitary member. More specifically, the projection 46b is made of a non-metallic material and is provided to the base portion of the sprocket main body 14. The projection 46b can, however, be separately provided from the bicycle sprocket 10 as well as the spike pin 40b, and affixed to the bicycle sprocket by adhesives or a fastener, for example. The projection 46b may also be made of a metallic material, formed integrally with the bicycle sprocket or affixed thereto by welding or a fastener, for example.

As seen in FIG. 3, in the first chain phase state, the projection 46b is disposed between adjacent two outer link plates 1a of the bicycle chain 1, not overlapping with the outer link plates 1a of the bicycle chain 1 when viewed from the axial direction D3 so that the projection 46b does not interfere with the outer link plates 1a of the bicycle chain 1. FIG. 5 provides another view of the projection 46b from an alternative angle.

Referring to FIG. 3, a distance L21 between the spike pin 40b and the projection 46b is equal to or shorter than a maximum longitudinal length L22 of the outer link plate 1a of the bicycle chain 1. In the illustrated embodiment, the distance L21 between the spike pin 40b and the projection 46b is shorter than the maximum longitudinal length L22 of the outer link plate 1a of the bicycle chain 1. The bicycle sprocket teeth 20 are arranged at a first pitch angle P1 in the circumferential direction D of the bicycle sprocket 10. A central angle P0 corresponding to a minimum circumferential distance between the spike pin 40b and the projection 46b is less than the first pitch angle P1. Similarly, the second sprocket teeth 36 are arranged at a second pitch angle P2 in the circumferential direction D. The central angle P0 corresponding to the minimum circumferential distance between the spike pin 40b and the projection 46b is less than the second pitch angle P2. The central angle P0, the first pitch angle P1, and the second pitch angle P2 are defined about the rotational center axis A.

As shown in FIG. 3, each of the bicycle sprocket teeth 20 has a tooth bottom 20a defining a root circle RC of the bicycle sprocket teeth 20. The spike pin 40b is disposed adjacent to the root circle RC. In the illustrated embodiment, the spike pin 40b is closer to the root circle RC than to an inner periphery 12b of the bicycle sprocket 10 when viewed from the axial direction D3. The projection 46b is closer to the root circle RC than to the inner periphery 12b of the bicycle sprocket 10 in a radial direction of the bicycle sprocket 10 when viewed from the axial direction D3. The projection 46b is positioned radially inwardly from the spike pin 40b. More specifically, a radially outermost end of the projection 46b is radially inwardly disposed with respect to a radially outermost end (i.e., the guiding part 41) of the spike pin 40b. The spike pin 40b is closer to the root circle RC than the projection 46b when viewed from the axial direction D3. A radial distance L31 between the spike pin 40b and the root circle RC is less than a radial distance L32 between the projection 46b and the root circle RC in a radial direction of the bicycle sprocket 10. The radial distance L31 can, however, be equal to or shorter than the radial distance L32 in the radial direction of the bicycle sprocket 10.

As illustrated in FIG. 3, the bicycle sprocket 10 may further include a closed tooth opening at least partially positioned radially outward from the root circle RC. In the illustrated embodiment, the bicycle sprocket 10 includes closed tooth openings 20b at least partially positioned radially outward from the root circle RC. The closed tooth openings 20b are respectively provided to the bicycle sprocket teeth 20; however, at least one of the bicycle sprocket teeth 20 can include the closed tooth opening 20b. Further, the closed openings 20b can be omitted from the bicycle sprocket 10 if needed and/or desired.

Figure 4:
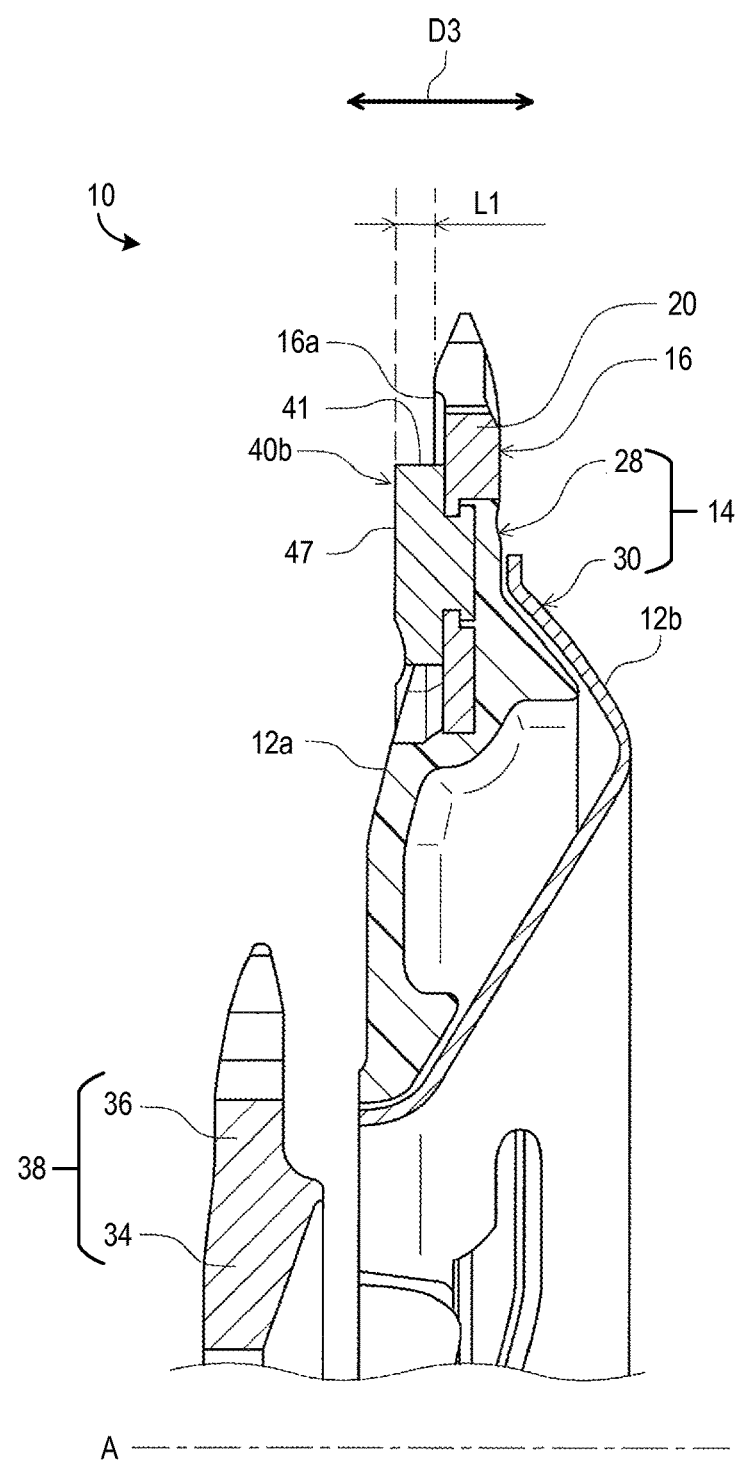
FIG. 4 is a cross-sectional view of the bicycle sprocket taken along line V-V of FIG. 3.

As seen in FIG. 4, a magnified cross-sectional view of the bicycle sprocket 10 taken along line V-V of FIG. 3 is provided, illustrating the spike pin 40b in detail. The bicycle sprocket 10 comprises bicycle sprocket teeth 20, a sprocket body 16, and a sprocket main body 14, which includes a base portion 28 to which the sprocket body 16 is attached, and a cover portion 30 attached to the base portion 28 to at least partially cover the base portion 28. The second sprocket 38 comprises a second sprocket main body 34 and second sprocket teeth 36. The second sprocket 38 is provided in proximity to the bicycle sprocket 10 so that a second shifting facilitation area facilitates a second shifting operation of a chain from the second sprocket 38 toward the bicycle sprocket 10. The spike pin 40b at least partially protrudes from the axial surface 12a of the bicycle sprocket 10. The spike pin 40b includes a guiding part 41 and an axial side surface 47. The axial surface 12a is disposed closer to the second sprocket 38 than the opposite surface 12b. The guiding part 41 is provided with a radially outward face and is configured to contact outer link plates of the bicycle chain when the spike pin 40b guides the bicycle chain to engage with the bicycle sprocket 10.

As illustrated in FIG. 4, the spike pin 40b protrudes from a tooth surface 16a of the sprocket body 16 by a first maximum length L1 in the axial direction D3 parallel to the rotational center axis A. The tooth surface 16a faces in the axial direction D3 and is contactable with the bicycle chain in a state where the bicycle chain engages with the bicycle sprocket 10. The first maximum length L1 is defined as the distance between the tooth surface 16a and the axial side surface 47 of the spike pin 40b in the axial direction D3.

As seen in FIG. 5, a perspective view of a part of the bicycle sprocket 10 shown in FIG. 1 is provided, facing the bicycle sprocket teeth 20 and the sprocket body 16 of the bicycle sprocket 10. Here, the primary recess 42b and the secondary recess 44b are illustrated in detail. The primary recess 42b is provided on the sprocket main body 14 of the bicycle sprocket 10, configured to reduce interference between the bicycle sprocket 10 and the bicycle chain moving in a rotational driving direction D1 in the first chain phase state, when an outer link plate of the chain partially disposed in the primary recess 42b. The primary recess 42b includes a first side surface 43 and a second side surface 45 which are offset from the axial surface 12a of the bicycle sprocket 10 in the axial direction D3 toward the sprocket body 16. The first side surface 43 is offset from the second side surface 45 in the axial direction D3 toward the sprocket body 16.

As illustrated in FIG. 5, a secondary recess 44b is also provided on the sprocket main body 14 of the bicycle sprocket 10, configured to reduce interference between the bicycle sprocket 10 and the chain when the guiding part 41 of the spike pin 40b guides the chain to engage with the bicycle sprocket 10. The secondary recess 44b includes a third side surface 48 which is offset from the axial surface 12a of the bicycle sprocket 10 in the axial direction D3 toward the sprocket body 16. In the illustrated embodiment, the third side surface 48 of the secondary recess 44b is defined on a surface of the sprocket body 16 in proximity to the axial side surface 47 of the spike pin 40b.

Figure 6:
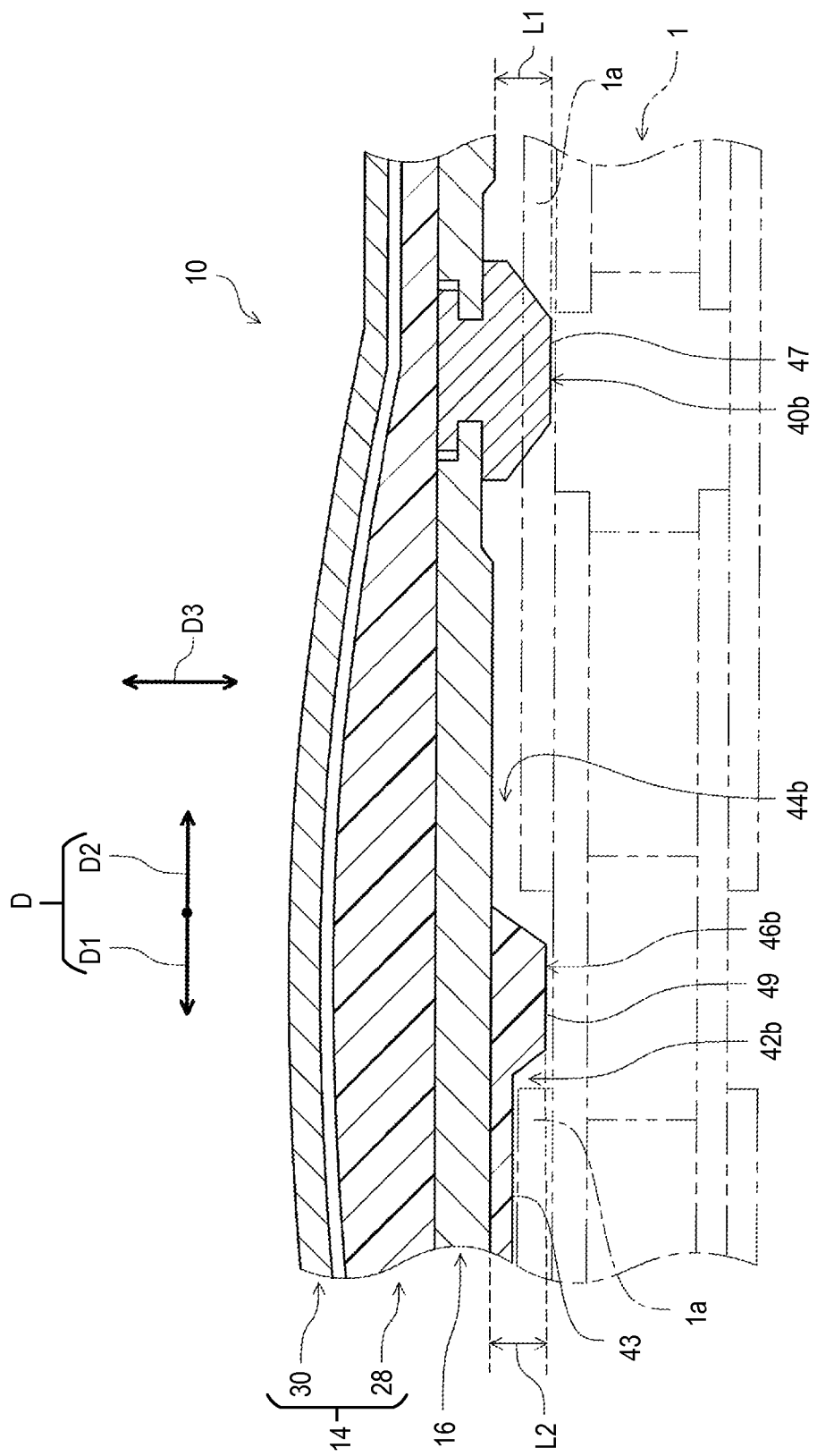
FIG. 6 is a cross-sectional view of a part of the bicycle sprocket taken along line VII-VII of FIG. 3.

As seen in FIG. 6, a cross-sectional view of a part of the bicycle sprocket 10 taken along line VII-VII of FIG. 3 is depicted. Here, illustrated in detail are the projection 46b, secondary recess 44b, and spike pin 40b in the first chain phase state where an outer link plate 1a of the chain is partially disposed on the first side surface 43 of the primary recess 42b. The bicycle sprocket 10 comprises a sprocket body 16, a sprocket main body 14 which includes a base portion 28 to which the sprocket body 16 is attached, and a cover portion 30 attached to the base portion 28 to at least partially cover the base portion 28. The projection 46b protrudes from the tooth surface of the bicycle sprocket 10 by a second maximum length L2 in the axial direction D3 so that the guiding surface 49 guides the chain away from the axial surface of the bicycle sprocket 10 in the axial direction D3. In the illustrated embodiment, the first maximum length L1, which is defined as the distance between the tooth surface and the axial side surface 47 of the spike pin 40b in the axial direction D3, is substantially equal to the second maximum length L2, which is defined as the distance between the tooth surface and the guiding surface 49 of the projection 46b in the axial direction D3. The second maximum length L2 is shorter than the first maximum length L1; however, the second maximum length L2 can also be longer than the first maximum length L1.

Figure 7:
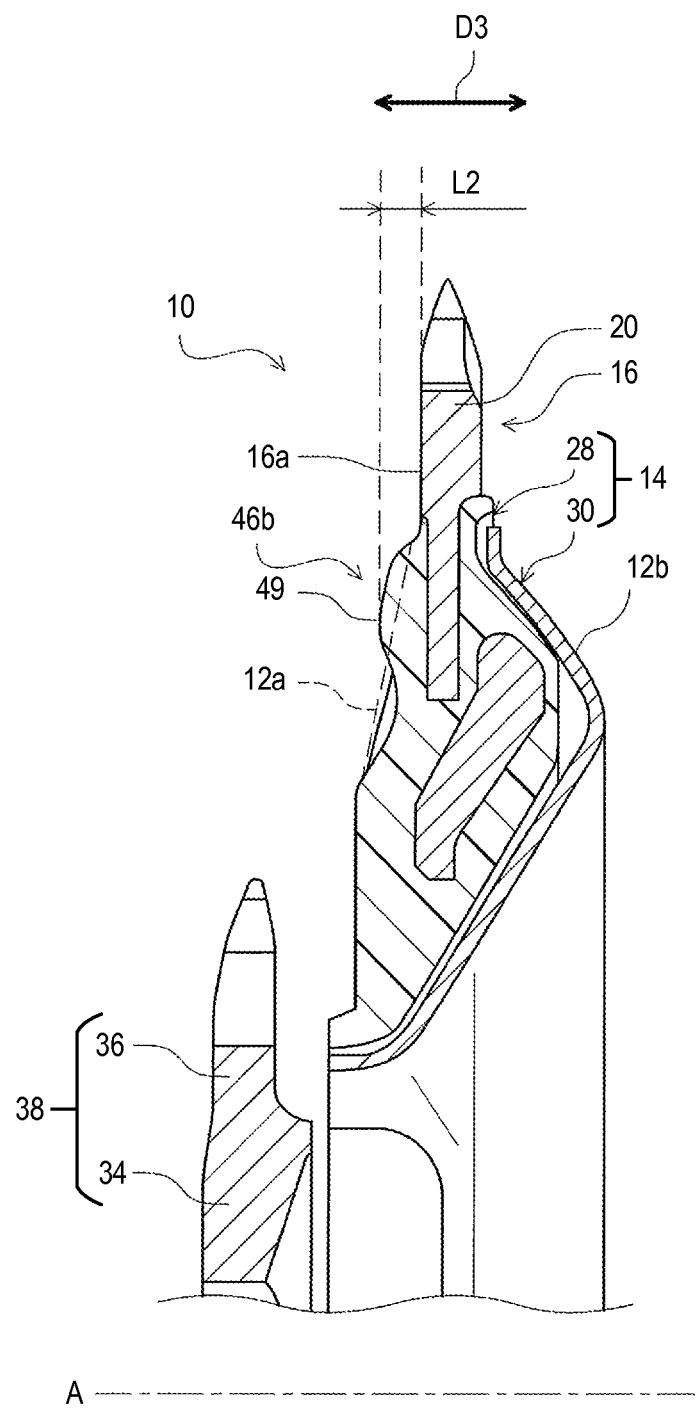
FIG. 7 is a cross-sectional view of a part of the bicycle sprocket taken along line VIII-VIII of FIG. 3.

As seen in FIG. 7, a cross-sectional view of a part of the bicycle sprocket 10 taken along line VIII-VIII of FIG. 3 is provided, illustrating the projection 46b in detail. The bicycle sprocket 10 comprises bicycle sprocket teeth 20 with a tooth surface 16a, a sprocket body 16, a sprocket main body 14 which includes a base portion 28 to which the sprocket body 16 is attached, and a cover portion 30 attached to the base portion 28 to at least partially cover the base portion 28. The second sprocket 38, comprising a second sprocket main body 34 and second sprocket teeth 36, is provided in proximity to the bicycle sprocket 10 so that a second shifting facilitation area facilitates a second shifting operation of a chain from the second sprocket 38 toward the bicycle sprocket 10. The projection 46b is provided on the axial surface 12a of the bicycle sprocket 10 to protrude in the axial direction D3 by a second maximum length L2 from the axial surface 12a which is disposed closer to the second sprocket 38 than the opposite surface 12b. The projection 46b includes a guiding surface 49 configured to guide the bicycle chain away from the axial surface 12a of the bicycle sprocket 10 in the axial direction D3 parallel to the rotational center axis A.

Figure 8:
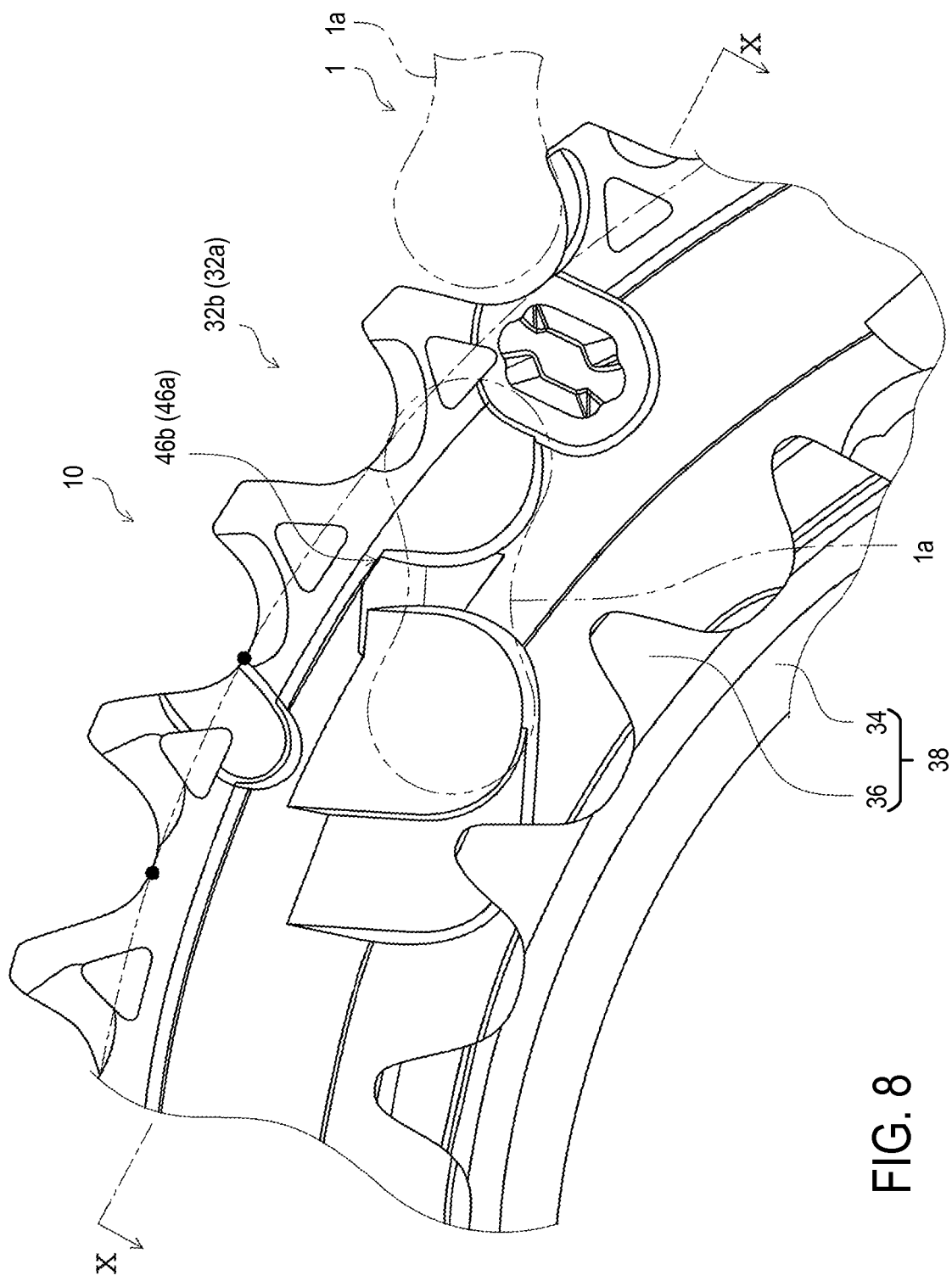
FIG. 8 is an enlarged inside elevational view of a part of the bicycle sprocket illustrated in FIG. 1 (a second chain phase state)

As seen in FIG. 8, an inside elevational view of the second shifting facilitation area 32b of the bicycle sprocket 10 in a second chain phase is enlarged in detail, along with an enlarged view of part of the second sprocket 38 which includes the second sprocket main body 34 and second sprocket teeth 36. The first sprocket has been removed from this view for illustration purposes. As with FIG. 3, since the first, second, and third shifting facilitation areas all have substantially the same structure, the structure of the second shifting facilitation area 32b will be described here in detail to be representative of the structure of all the shifting facilitation areas.

As shown in FIG. 8, the bicycle chain 1 can be offset, with respect to the first chain phase state of the bicycle chain 1 illustrated in FIG. 3, by a chain pitch of the bicycle chain 1 in a second chain phase that is different from the first chain phase. In this example, the second projection 46b of the second shifting facilitation area 32b is depicted. The second projection 46b is positioned so as to contact the chain 1 and urge the chain 1 in an axial direction parallel to the rotational center axis A to move the chain 1 away from the bicycle sprocket 10 in the second chain phase of the chain 1, illustrated in FIG. 8, on the second sprocket 38 during the second shifting operation. In one example, the urging of the chain 1 by the second projection 46b may prevent the chain from contacting the second spike pin 40b. The second projection 46b is configured to prevent the chain 1 from engaging the second spike pin 40b (by contacting the chain 1) during the first shifting operation while the first sprocket 22 (not shown) is mounted to the bicycle sprocket 10. Likewise, in the first shifting facilitation area 32a, illustrated in FIG. 1, the first projection 46a is positioned downstream and/or radially inwardly from the first spike pin 40a with respect to the rotational center axis A. The first projection 46a is positioned so as to contact the chain 1 and urge the chain 1 in an axial direction parallel to the rotational center axis A to move the chain 1 away from the bicycle sprocket 10 in the second chain phase of the chain 1, as depicted in FIG. 8, on the first sprocket 22 during the first shifting operation. In one example embodiment, the urging of the chain 1 by the first projection 46a may prevent the chain from contacting the first spike pin 40a. The first projection 46a is configured to prevent the chain 1 from engaging the first spike pin 40a (by contacting the chain 1) during the second shifting operation while the second sprocket 38 is mounted to the bicycle sprocket 10. It will be appreciated that the projection 46b at least partially overlaps with the outer link plate 1a of the bicycle chain 1 in the second chain phase state, whereas the projection 46b does not overlap with the outer link plate 1a in the first chain phase state when viewed from the axial direction D3. For example, the projection 46b at least partially overlaps with a longitudinal middle portion of the outer link plate 1a of the bicycle chain 1 in the second chain phase state when viewed from the axial direction D3.

Figure 9:
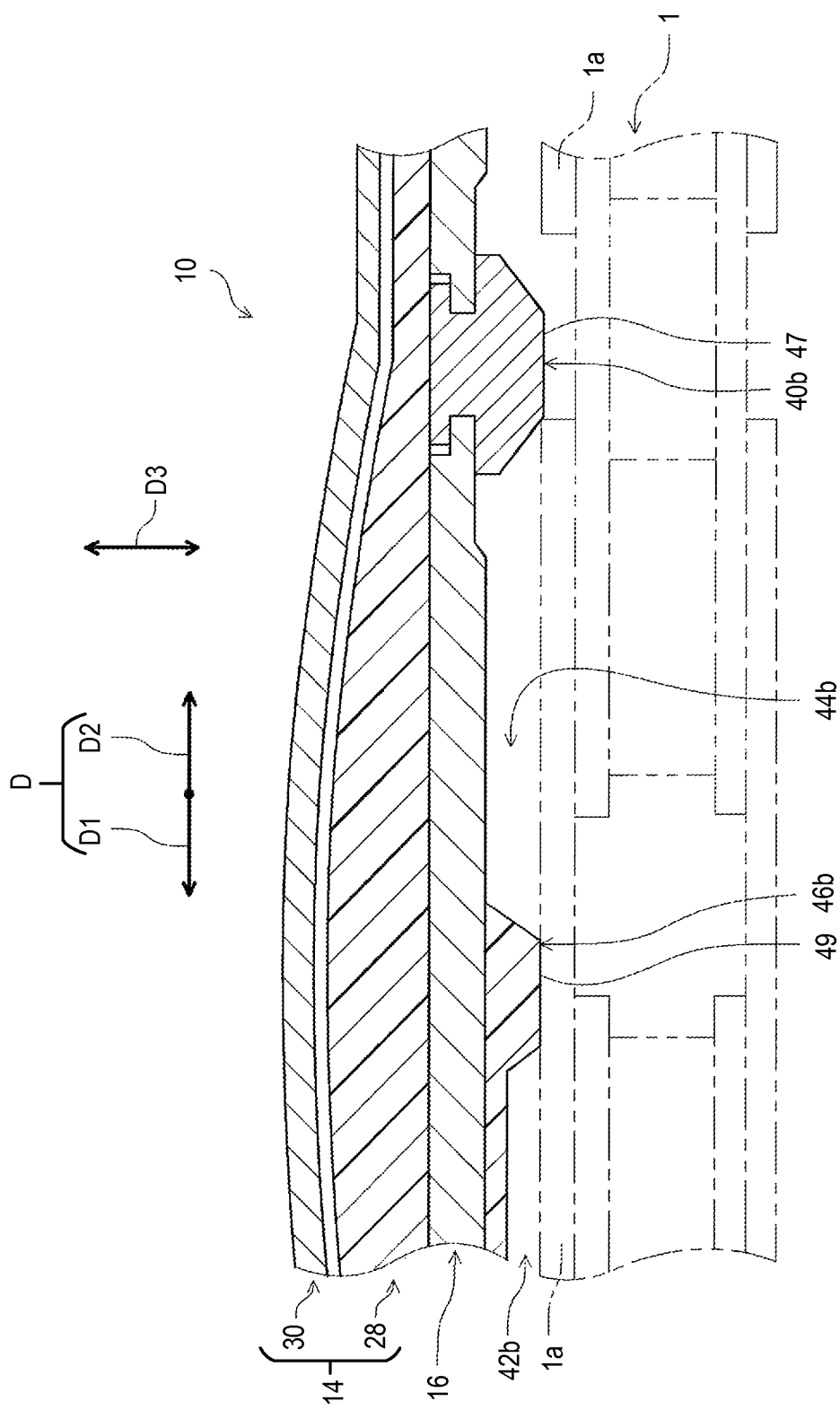
FIG. 9 is a cross-sectional view of a part of the bicycle sprocket taken along line X-X of FIG. 8.

As seen in FIG. 9, a cross-sectional view of a part of the bicycle sprocket taken along line X-X of FIG. 8 is provided. Here, illustrated in detail are the primary recess 42b, the projection 46b, the secondary recess 44b, and the spike pin 40b in the second chain phase, where the projection 46b at least partially overlaps with a longitudinal middle portion of the outer link plate 1a of the bicycle chain 1 moving in a rotational driving direction D1, and the axial side surface 47 of the spike pin 40b at least partially overlaps with an inner link of the bicycle chain 1 adjacent to the outer link plate 1a. The bicycle sprocket 10 comprises a sprocket body 16, a sprocket main body 14 which includes a base portion 28 to which the sprocket body 16 is attached, and a cover portion 30 attached to the base portion 28 to at least partially cover the base portion 28. The guiding surface 49 of the projection 46b is configured to guide the bicycle chain 1 away from the bicycle sprocket 10 in the axial direction D3 parallel to the rotational center axis A (depicted in FIG. 1) in the second chain phase state that is different from the first chain phase state. The projection 46b is configured to guide the bicycle chain 1 away from the axial surface of the bicycle sprocket 10 in the axial direction D3 when in the second chain phase state. When the bicycle chain 1 is axially guided toward the bicycle sprocket 10 using the front derailleur (not shown) during the gear-shifting operation, the bicycle chain 1 is moved away from the bicycle sprocket 10 in the axial direction D3 by the projection 46b in the second chain phase state. This reduces interference between the spike pin 40b and the bicycle chain 1 in the second chain phase state during the gear-shifting operation. Accordingly, with the bicycle sprocket 10, it is possible to reduce undesired impact and/or noise during the gear-shifting operation.

Figure 10:
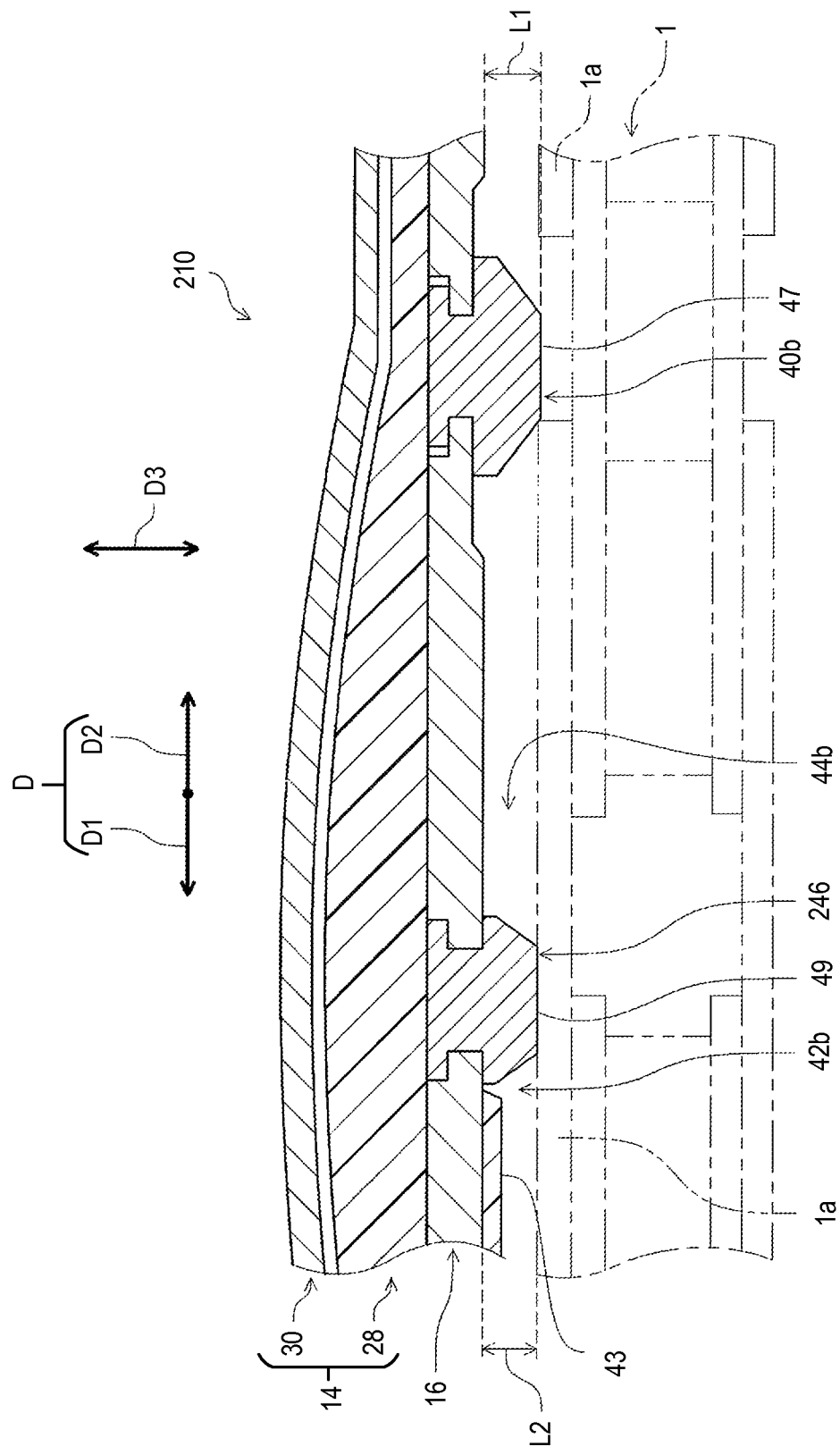
FIG. 10 is a cross-sectional view of a part of a bicycle sprocket in accordance with a second embodiment.

Referring to FIG. 10, a bicycle sprocket 210 in accordance with a second embodiment will be described below. The bicycle sprocket 210 has the same configuration as the bicycle sprocket 10 except for the structure of the projection 246. Thus, elements having substantially the same function as those in the first embodiment will be numbered the same here. Here, illustrated in detail are the primary recess 42b, the projection 246, the secondary recess 44b, and the spike pin 40b in the second chain phase, where the guiding surface 49 of the projection 246 at least partially overlaps with a longitudinal middle portion of the outer link plate 1a of the bicycle chain 1 moving in a rotational driving direction D1, the axial side surface 47 of the spike pin 40b at least partially overlaps with an inner link of the bicycle chain 1, and the first side surface 43 of the primary recess 42b is separated from the outer link plate 1a of the bicycle chain 1. The spike pin 40b protrudes from a tooth surface of the sprocket body by a first maximum length L1 in the axial direction D3, and the projection 246 protrudes from the tooth surface of the bicycle sprocket 10 by a second maximum length L2 in the axial direction D3.

The bicycle sprocket 210 comprises a projection 246 provided to the bicycle sprocket 10. Unlike the projection 46b of the first embodiment, the projection 246 is attached to the bicycle sprocket 10 as a separate member from the sprocket main body 14, which includes a base portion 28 to which the sprocket body 16 is attached, and a cover portion 30 attached to the base portion 28 to at least partially cover the base portion 28. In the illustrated embodiment, the projection 246 is attached to the sprocket body 16 as a separate member from the sprocket main body 14. The projection 246 can be made of material different from the materials of the bicycle sprocket 10. The projection 246 may also be made of material that is the same as the materials of the bicycle sprocket 10.

With the bicycle sprocket 210, the projection 246 is configured to guide the bicycle chain 1 away from the bicycle sprocket 10 in the axial direction D3 parallel to the rotational center axis A (depicted in FIG. 1) in the second chain phase state. This reduces interference between the spike pin 40b and the bicycle chain 1 in the second chain phase state during the gear shifting. Accordingly, with the bicycle sprocket 210, it is possible to reduce undesired impact during the gear-shifting operation.

Figure 11:
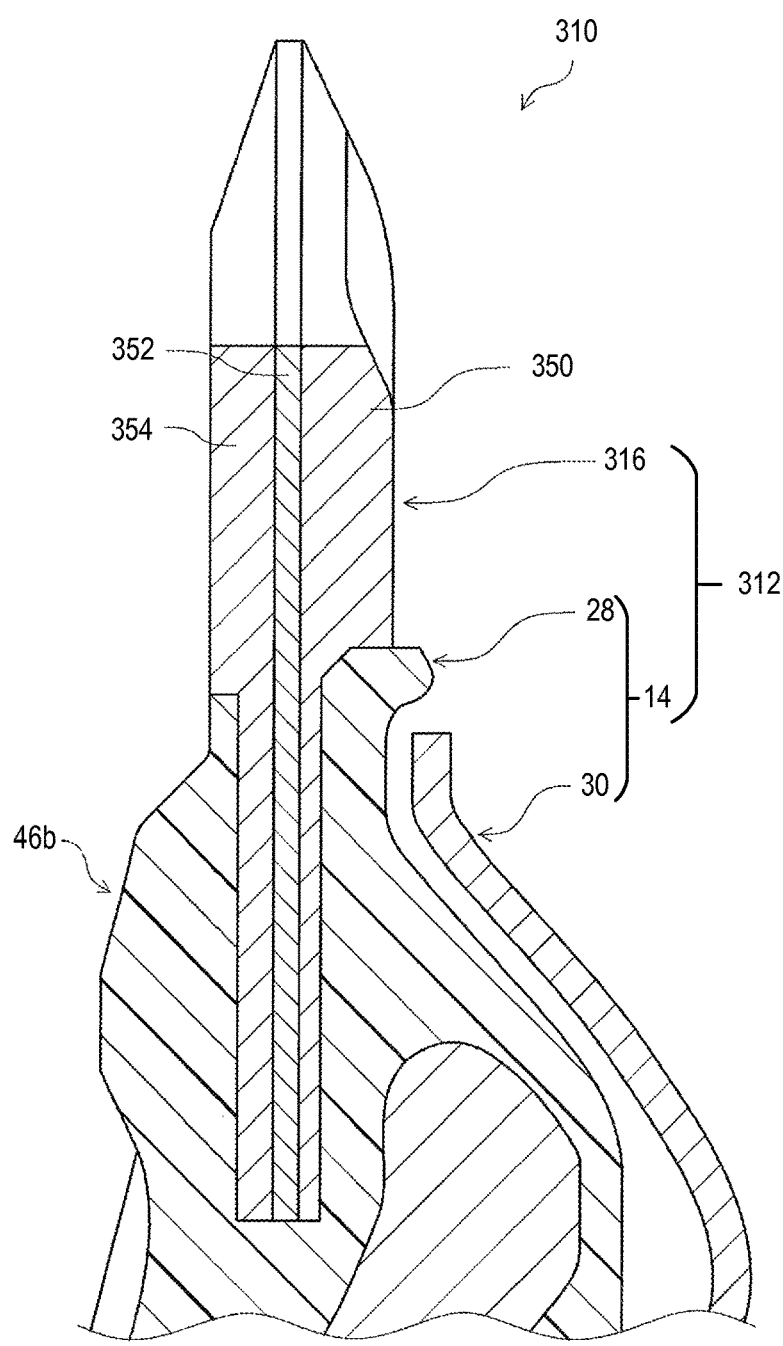
FIG. 11 is a cross-sectional view of a part of a bicycle sprocket in accordance with a third embodiment.

Referring to FIG. 11, a bicycle sprocket 310 in accordance with a third embodiment will be described below, with the projection 46b and the bicycle sprocket member 312 illustrated in detail. The bicycle sprocket 310 has the same configuration as the bicycle sprocket 10 except for the structure of the bicycle sprocket member 312. Thus, elements having substantially the same function as those in the above embodiments will be numbered the same here.

As seen in FIG. 11, the bicycle sprocket 310 comprises a bicycle sprocket member 312. The bicycle sprocket member 312 includes the sprocket body 316, the sprocket main body 14 which includes a base portion 28 to which the sprocket body 316 is attached and a cover portion 30 attached to the base portion 28 to at least partially cover the base portion 28. The sprocket body 316 is attached to the sprocket main body 14 and includes first sprocket teeth arranged in the circumferential direction of the bicycle sprocket 310. The sprocket body 316 has a multi-layered structure with different materials.

The sprocket body 316 includes a first sprocket layer 350, a second sprocket layer 352 and a third sprocket layer 354. The first sprocket layer 350 is made of a first-layer material comprising iron. The second sprocket layer 352 is made of a second-layer material comprising aluminum. The third sprocket layer 354 is made of a third-layer material comprising iron. The second sprocket layer 352 is provided between the first sprocket layer 350 and the third sprocket layer 354 in the axial direction D3. Possible examples of materials of the first sprocket layer 350 and third sprocket layer 354 include iron and stainless steel. Possible examples of materials of the second sprocket layer 352 include aluminum, titanium, magnesium and beryllium.

In the illustrated embodiment, the first sprocket layer 350 and the third sprocket layer 354 are bonded to the second sprocket layer 352 by diffusion bonding, for example. At least one of the first sprocket layer 350 and the third sprocket layer 354 can be bonded to the second sprocket layer 352 with adhesive. The second sprocket layer 352 is made of a metallic material; however, the second sprocket layer 352 can be made of a second-layer material comprising a non-metallic material. For example, the second-layer material can comprise fiber reinforced plastic. In a case where the second-layer material is fiber reinforced plastic, the first sprocket layer 350 and third sprocket layer 354 may be bonded to the second sprocket layer 352 by an integral molding process. Thus, with the bicycle sprocket 310, it is possible to save weight of the bicycle sprocket 310 in addition to the reduction of undesired impact during the gear-shifting operation.

Figure 12:
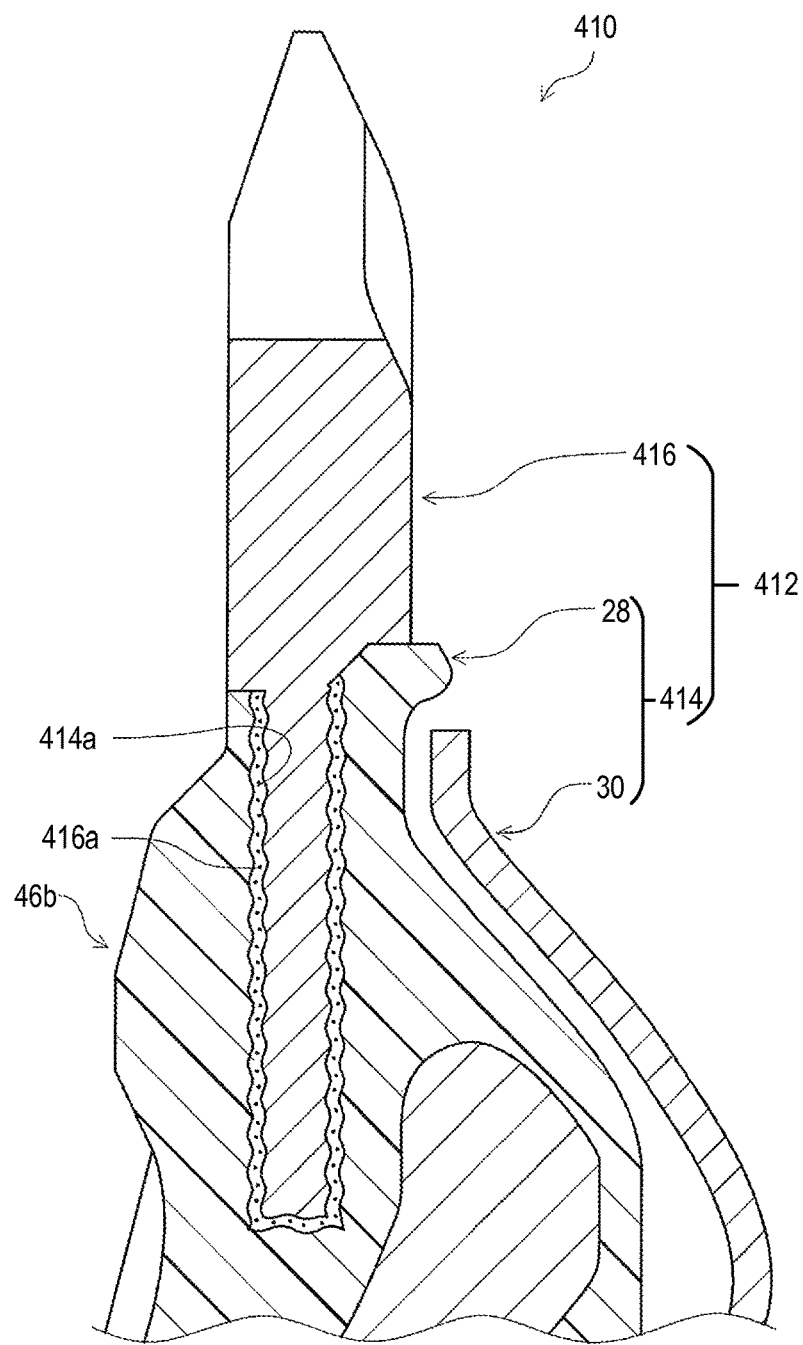
FIG. 12 is a cross-sectional view of a part of a bicycle sprocket in accordance with a fourth embodiment.

Referring to FIG. 12, a bicycle sprocket 410 in accordance with a fourth embodiment will be described below, with the projection 46b and the bicycle sprocket member 412 illustrated in detail. The bicycle sprocket 410 has the same configuration as the bicycle sprocket 10 except for the bicycle sprocket member 412. Thus, elements having substantially the same function as those in the above embodiments will be numbered the same here.

As seen in FIG. 12, the bicycle sprocket 410 comprises a bicycle sprocket member 412. The bicycle sprocket member 412 includes a sprocket body 416, a sprocket main body 414 which includes a base portion 28 to which the sprocket body 416 is attached and a cover portion 30 attached to the base portion 28 to at least partially cover the base portion 28, so that the sprocket body 416 is attached to the sprocket main body 414.

Unlike the bicycle sprocket 10 of the first embodiment, roughening process is applied to an attachment surface of at least one of the first main body 414 and the sprocket body 416. Possible examples of the roughening process include machine processes such as shot blasting, chemical processes such as etching, and other processes such as laser machining. More specifically, the sprocket body 416 includes a sprocket body attachment surface 416a. The sprocket main body 414 includes a sprocket main body attachment surface 414a configured to be attached to the sprocket body attachment surface 416a of the sprocket body 416. At least one of the sprocket body attachment surface 416a and the sprocket main body attachment surface 414a is at least partially rougher than a surface of the bicycle sprocket member 412 other than the sprocket body attachment surface 416a and the sprocket main body attachment surface 414a. In the illustrated embodiment, the roughening process is applied to each of the sprocket body attachment surface 416a and the sprocket main body attachment surface 414a.

Areas of the sprocket body attachment surface 416a and the sprocket main body attachment surface 414a are not limited to the illustrated embodiment in FIG. 12. For example, the lengths and inclinations of the attachment surfaces may vary depending on the dimensions of the sprocket body and sprocket main body and the desired strength of attachment. In accordance with the fourth embodiment, it is possible to increase the strength of attachment between the sprocket main body 414 and the sprocket body 416 in addition to the reduction of undesired impact during the gear-shifting operation.

Figure 13A:
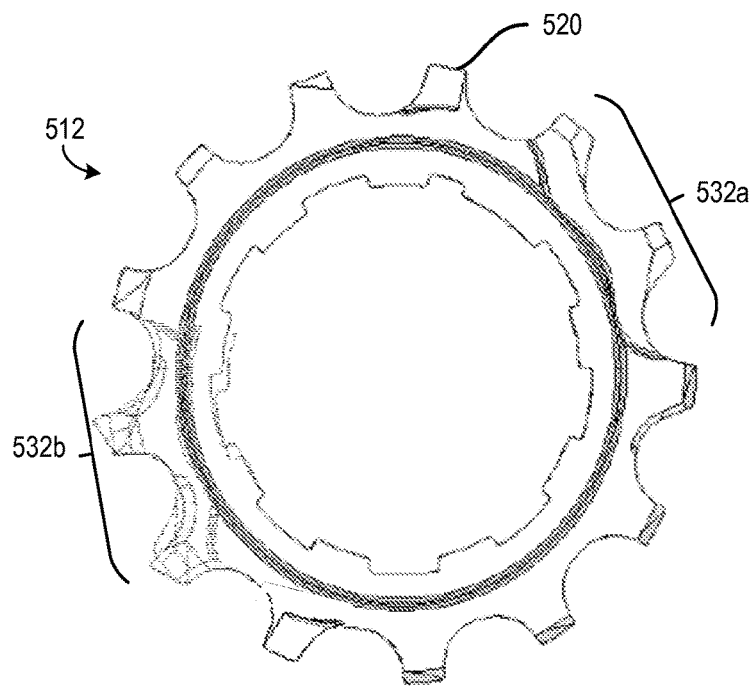
FIGS. 13A-C are outside elevational views of a rear bicycle sprocket, first rear sprocket, and second rear sprocket in accordance with a fifth embodiment.
Figure 13B:
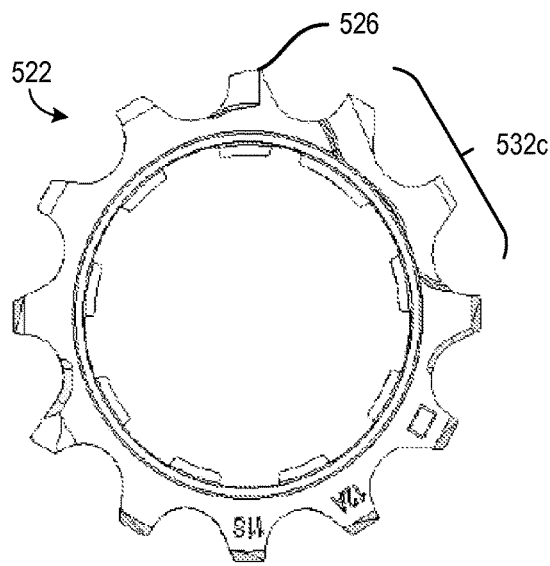
Figure 13C:
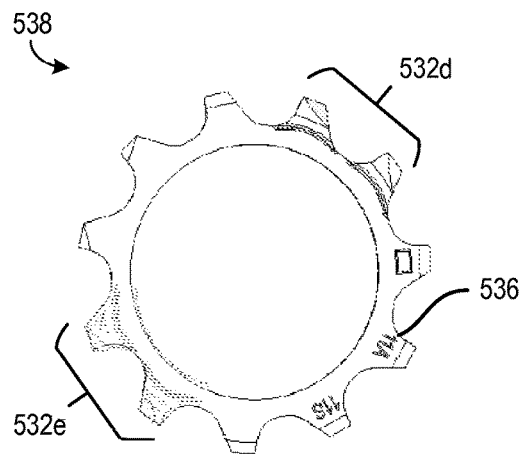

Referring to FIGS. 13A-C, described is another embodiment of the present invention, featuring a rear sprocket assembly. The rear sprocket assembly of the fifth embodiment of the present invention has been disassembled to show a rear bicycle sprocket 512, a first rear sprocket 522 and a second rear sprocket 538 in separate Figures. Turning to FIG. 13A, a depiction of a rear bicycle sprocket 512 with 13 teeth 520 is shown in accordance with the fifth embodiment. Unlike the conventional art, the rear bicycle sprocket 512 comprises two shifting facilitation areas: a first shifting facilitation area 532a which facilitates a first shifting operation that includes shifting a chain from the first rear sprocket 522 to the rear bicycle sprocket 512 and a second shifting facilitation area 532b which facilitates a second shifting operation that includes shifting a chain from the second rear sprocket 538 to the rear bicycle sprocket 512. Turning to FIG. 13B, depicted is a first rear sprocket 522 with twelve teeth 526, smaller than the bicycle sprocket 512, having one shifting facilitation area 532c which facilitates a shifting operation that includes shifting the chain from the second rear sprocket 538 to the first rear sprocket 522. Turning to FIG. 13C, depicted is a second rear sprocket 538 with eleven teeth 536 that is smaller than the bicycle sprocket 512 and the first rear sprocket 522. The second rear sprocket 538 comprises two shifting facilitation areas, a first auxiliary shifting facilitation area 532d which facilitates a shifting operation that includes shifting the chain from the second rear sprocket 538 to the first rear sprocket 522, and a second auxiliary shifting facilitation area 532e which facilitates a shifting operation that includes shifting the chain from the second rear sprocket 538 to the bicycle sprocket 512.

It will be appreciated that, unlike the conventional art, in the bicycle sprocket 512 and second sprocket 538 of the claimed rear sprocket assembly, two shifting facilitation areas are provided. Accordingly, it is possible to replace one of the first rear sprocket 522 and the second rear sprocket 538 with the other of the first rear sprocket 522 and the second rear sprocket 538 from a multiple rear sprocket assembly according to need. The number of teeth for each sprocket is not limited as long as the first rear sprocket 522 is smaller than the bicycle sprocket 512, and the second rear sprocket 538 is smaller than the bicycle sprocket 512 and the first rear sprocket 522.

In the above embodiments, the term "attached" or "attaching", as used herein, encompasses configurations in which an element directly attached to another element by affixing the element is directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "fixed" and their derivatives except for the terms "bonded" and "bonding."

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" or "element" when used in the singular can have the dual meaning of a single part or a plurality of parts.

The ordinal numbers such as the terms "first" or "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "bicycle" and its derivatives, as used herein, are intended to be open ended terms that specify any vehicle or machine with a wheel that is propelled by the action of a cyclist's feet upon pedals, and encompasses outdoor bicycles, stationary bicycles, exercise cycles, indoor bicycles, and the like.

Finally, terms of degree such as "substantially", "about" and "approximately" as used herein mean a reasonable amount of deviation of the modified term such that the end result is not significantly changed (e.g., manufacturing tolerances).

Obviously, numerous modifications and variations of the present invention are possible in light of the above teachings. It is therefore to be understood that within the scope of the appended claims, the invention may be practiced otherwise than as specifically described herein.

The invention claimed is:

1. A bicycle sprocket having a rotational center axis, the bicycle sprocket being a large-diameter sprocket comprising:

a first shifting facilitation area provided on a surface of the large-diameter sprocket and configured to facilitate a first shifting operation shifting a chain from an intermediate-diameter sprocket having a first tooth number to the large-diameter sprocket; and a second shifting facilitation area provided on the surface of the large-diameter sprocket and configured to facilitate a second shifting operation shifting the chain from a small-diameter sprocket having a second tooth number to the large-diameter sprocket, wherein the first tooth number is larger than the second tooth number;

the large-diameter sprocket has a third tooth number that is larger than both the first tooth number and the second tooth number, the intermediate-diameter sprocket and the small-diameter sprocket are interchangeably mountable to co-rotate with the large-diameter sprocket; and the first shifting facilitation area and the second shifting facilitation area are provided at the same location on the large-diameter sprocket as common shifting facilitation areas to facilitate both the first shifting operation and the second shifting operation.

2. The bicycle sprocket of claim 1, wherein
the intermediate-diameter sprocket is a smaller sprocket than the large-diameter sprocket; and
the small-diameter sprocket is a smaller sprocket than the large-diameter sprocket.

3. The bicycle sprocket of claim 1, wherein
the first shifting facilitation area includes a first spike pin provided on the large-diameter sprocket; and
the second shifting facilitation area includes a second spike pin provided on the large-diameter sprocket.

4. The bicycle sprocket of claim 3, wherein,
the first shifting facilitation area includes a first projection provided on the large-diameter sprocket; and
the second shifting facilitation area includes a second projection provided on the large-diameter sprocket.

5. The bicycle sprocket of claim 4, wherein
the first projection is positioned so as to avoid contact of the first projection with the chain in a first chain phase of the chain on the intermediate-diameter sprocket during the first shifting operation.

6. The bicycle sprocket of claim 5, wherein
the first projection is positioned so as to contact a chain and urge the chain in an axial direction parallel to the rotational center axis to move the chain away from the large-diameter sprocket in a second chain phase of the chain on the intermediate-diameter sprocket during the first shifting operation; and the second chain phase is different from the first chain phase.

7. The bicycle sprocket of claim 6, wherein
the urging of the chain by the first projection prevents the chain from contacting the first spike pin.

8. The bicycle sprocket of claim 5, wherein
the second projection is positioned so as to avoid contact of the second projection with the chain in the first chain phase of the chain on the small-diameter sprocket during the second shifting operation.

9. The bicycle sprocket of claim 8, wherein
the second projection is positioned so as to contact the chain and urge the chain in an axial direction parallel to the rotational center axis to move the chain away from the large-diameter sprocket in a second chain phase of the chain on the small-diameter sprocket during the second shifting operation; and the second chain phase is different from the first chain phase.

10. The bicycle sprocket of claim 9, wherein
the urging of the chain by the second projection prevents the chain from contacting the second spike pin.

11. The bicycle sprocket of claim 1, wherein
the first shifting operation includes shifting a chain from the intermediate-diameter sprocket to the large-diameter sprocket, and
the second shifting operation includes shifting the chain from the small-diameter sprocket to the large-diameter sprocket.

12. The bicycle sprocket of claim 1, wherein
the first shifting facilitation area and the second shifting facilitation area are provided so as to be circumferentially spaced apart from each other on the large-diameter sprocket with respect to the rotational center axis.

13. The bicycle sprocket of claim 1, wherein
the first shifting facilitation area is one of a plurality of first shifting facilitation areas provided on the large-diameter sprocket, and
the plurality of the first shifting facilitation areas are disposed so as to be circumferentially spaced apart from each other with respect to the rotational center axis.

14. The bicycle sprocket of claim 13, wherein
the second shifting facilitation area is one of a plurality of second shifting facilitation areas provided on the large-diameter sprocket, and
the plurality of second shifting facilitation areas are disposed so as to be circumferentially spaced apart from each other with respect to the rotational center axis.

15. The bicycle sprocket of claim 14, wherein
at least one of the first shifting facilitation areas and at least one of the second shifting facilitation areas are provided at the same location on the large-diameter sprocket.

16. The bicycle sprocket of claim 3, wherein
the first shifting facilitation area includes a first recess provided on the large-diameter sprocket; and
the second shifting facilitation area includes a second recess provided on the large-diameter sprocket.

17. The bicycle sprocket of claim 16, wherein
the first recess provided is positioned downstream from the first spike pin with respect to a rotational driving direction of the large-diameter sprocket; and
the second recess provided is positioned downstream from the second spike pin with respect to the rotational driving direction.

18. The bicycle sprocket of claim 16, wherein
the first recess is positioned radially inwardly from the first spike pin with respect to the rotational center axis; and
the second recess is positioned radially inwardly from the second spike pin with respect to the rotational center axis.

19. The bicycle sprocket of claim 1, wherein
the large-diameter sprocket further includes a sprocket body including an annular portion having sprocket teeth formed around an outer perimeter thereof, the annular portion including a smaller sprocket facing side on which the first shifting facilitation area and the second shifting facilitation area are provided.

20. The bicycle sprocket of claim 4, wherein
the first projection is positioned downstream from the first spike pin with respect to a rotational driving direction of the large-diameter sprocket; and the second projection is positioned downstream from the second spike pin with respect to the rotational driving direction.

21. The bicycle sprocket of claim 4, wherein
the first projection is positioned radially inwardly from the first spike pin with respect to the rotational center axis; and
the second projection is positioned radially inwardly from the second spike pin with respect to the rotational center axis.

22. The bicycle sprocket of claim 4, wherein
the first shifting facilitation area includes a first recess provided on the large-diameter sprocket;
the second shifting facilitation area includes a second recess provided on the large-diameter sprocket;
the first projection is positioned between the first spike pin and the first recess in a radial direction with respect to the rotational center axis; and
the second projection is positioned between the second spike pin and the second recess in a radial direction with respect to the rotational center axis.

23. The bicycle sprocket of claim 22, wherein
the first projection is positioned between the first spike pin and the first recess in a circumferential direction with respect to the rotational center axis; and
the second projection is positioned between the second spike pin and the second recess in a circumferential direction with respect to the rotational center axis.

24. The bicycle sprocket of claim 4, wherein
the first projection is configured to prevent a chain from engaging the first spike pin during the second shifting operation while the small-diameter sprocket is mounted to the large-diameter sprocket.

25. The bicycle sprocket of claim 24, wherein
the second projection is configured to prevent a chain from engaging the second spike pin during the first shifting operation while the intermediate-diameter sprocket is mounted to the large-diameter sprocket.

26. The bicycle sprocket of claim 1, wherein
the large-diameter sprocket is a bicycle front sprocket.

27. The bicycle sprocket of claim 1, wherein
the large-diameter sprocket is a bicycle rear sprocket.

* * * * *